United States Patent [19]
Feldhausen et al.

[11] Patent Number: 6,124,567
[45] Date of Patent: Sep. 26, 2000

[54] DIE CAST HOUSING FOR WELDING MACHINE GENERATOR

[75] Inventors: Joseph E. Feldhausen, Appleton; David E. Radtke, New London, both of Wis.

[73] Assignee: Illinois Tool Works Inc., Glenview, Ill.

[21] Appl. No.: 09/209,523

[22] Filed: Dec. 10, 1998

[51] Int. Cl.[7] .................. B23K 9/00; H02K 9/10
[52] U.S. Cl. .......................... 219/130.1; 310/52
[58] Field of Search .............. 219/133; 310/89, 310/58; 290/1 B, 1 R

[56] References Cited

U.S. PATENT DOCUMENTS

| | | | |
|---|---|---|---|
| D. 384,033 | 9/1997 | Takeda et al. | D13/114 |
| 3,882,334 | 5/1975 | Newill | 310/59 |
| 4,048,530 | 9/1977 | Kaufman | 310/89 |
| 4,055,778 | 10/1977 | Binder | 310/89 |
| 4,074,159 | 2/1978 | Robison | 310/154 |
| 4,100,440 | 7/1978 | Binder et al. | 310/89 |
| 4,128,778 | 12/1978 | Merkle et al. | 310/67 R |
| 4,131,156 | 12/1978 | Crumrine, Jr. et al. | 165/51 |
| 4,184,804 | 1/1980 | Inagaki et al. | 415/213 R |
| 4,253,800 | 3/1981 | Segawa | 416/203 |
| 4,293,756 | 10/1981 | Hoyt, Jr. et al. | 219/133 |
| 4,396,351 | 8/1983 | Hayashi et al. | 415/172 A |
| 4,429,242 | 1/1984 | Layh | 310/71 |
| 4,472,649 | 9/1984 | Nanba et al. | 310/68 D |
| 4,474,534 | 10/1984 | Thode | 416/203 |
| 4,538,963 | 9/1985 | Sugio | 416/203 |
| 4,659,950 | 4/1987 | Gotoh | 310/59 |
| 4,680,493 | 7/1987 | Ziegler | 310/62 |
| 4,684,835 | 8/1987 | Kline, Jr. et al. | 310/59 |
| 4,801,831 | 1/1989 | Lewis | 310/91 |
| 4,820,947 | 4/1989 | Beisiegel et al. | 310/89 |
| 4,827,166 | 5/1989 | Morrill | 310/88 |
| 4,835,428 | 5/1989 | Komurasaki et al. | 310/68 |
| 4,945,272 | 7/1990 | Ochi et al. | 310/91 |
| 4,992,687 | 2/1991 | Nel | 310/68 |
| 5,019,733 | 5/1991 | Kano et al. | 310/61 |
| 5,019,737 | 5/1991 | Bruno | 310/89 |
| 5,057,729 | 10/1991 | Tominaga | 310/89 |
| 5,077,503 | 12/1991 | Tamura et al. | 310/88 |
| 5,144,182 | 9/1992 | Lemmer et al. | 310/217 |
| 5,182,482 | 1/1993 | Burke | 310/89 |
| 5,296,769 | 3/1994 | Havens et al. | 310/90 |
| 5,296,772 | 3/1994 | Bradfield | 310/242 |
| 5,497,544 | 3/1996 | Bien et al. | 29/596 |
| 5,591,362 | 1/1997 | Feldhausen et al. | 219/133 |
| 5,607,608 | 3/1997 | Feldhausen et al. | 219/133 |
| 5,796,190 | 8/1998 | Takeda et al. | 310/58 |
| 5,883,448 | 3/1999 | Zimmerman | 310/52 |

FOREIGN PATENT DOCUMENTS

| | | | |
|---|---|---|---|
| 2045014 | 10/1980 | United Kingdom | 219/233 |

*Primary Examiner*—Patrick Ryan
*Assistant Examiner*—Anjan Dey
*Attorney, Agent, or Firm*—Mark W. Croll; John P. O'Brien; Donald J. Breh

[57] ABSTRACT

The generator of an engine-driven welding machine is comprised of front and rear housings that attach directly to each other. The generator stator maybe secured solely to one or the other housing with preloaded screws. Alternately, one or more preload elements may be interposed between the stator and one of the front or rear generator housings. Thermal stresses are thereby avoided between the stator and the generator housings, despite the housings being made of aluminum and the stator being made of steel. The rear generator housing has an end wall that is mountable to different selected internal combustion engines by means of teardrop shaped clearance holes and machineable bosses. Slots for cooling air in the rear generator housing have sides with tangential components. Air leaves a fan in the generator with tangential components that are matched by the rear generator housing slots. The fan incorporates both fan blades and a baffle having a close clearance with an annular wall of the rear generator housing. Side ducts in the rear generator housing allow cooling air to flow around the front generator housing and into the rear generator housing before being expelled out the rear generator housing slots.

25 Claims, 5 Drawing Sheets

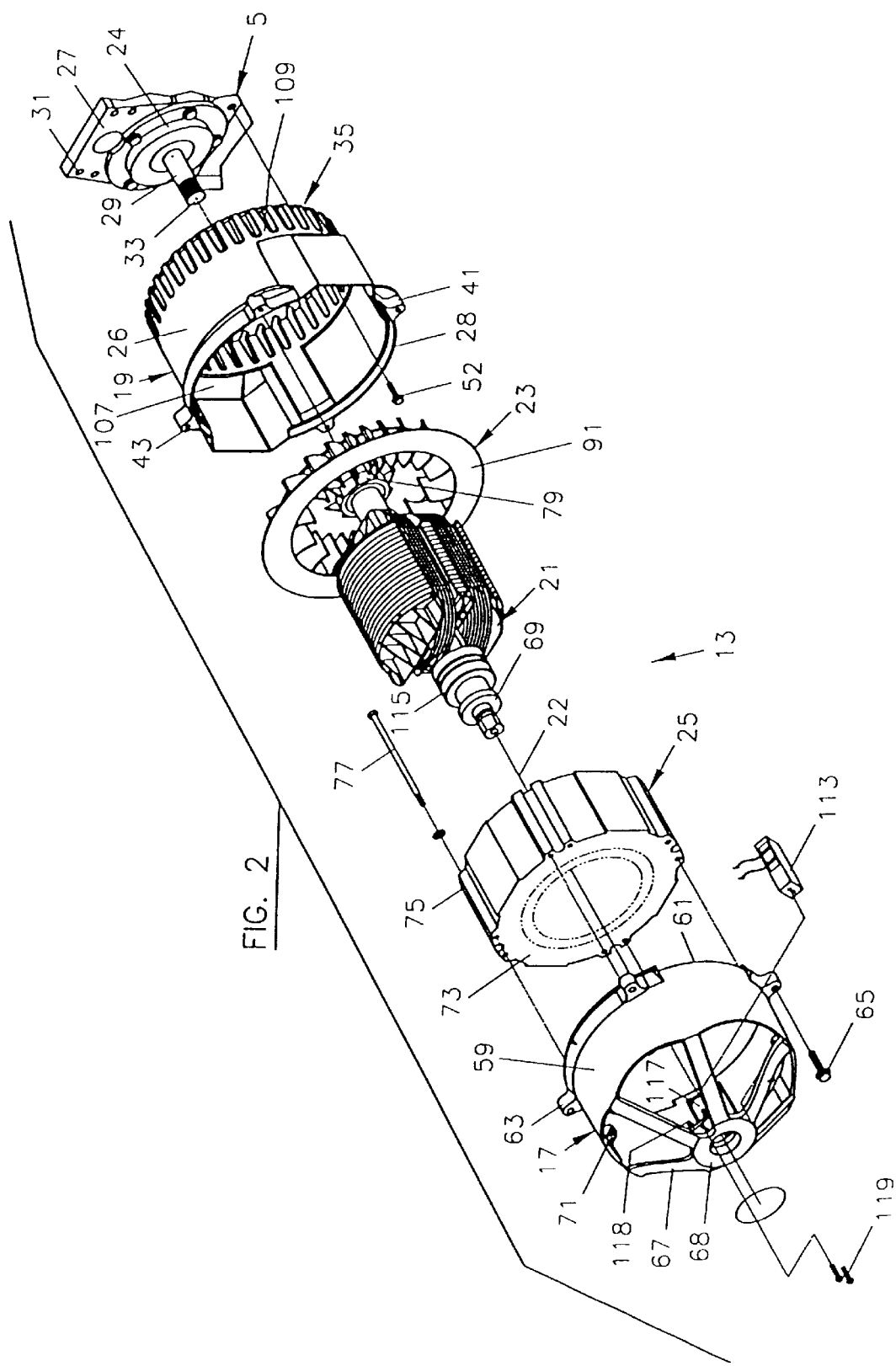

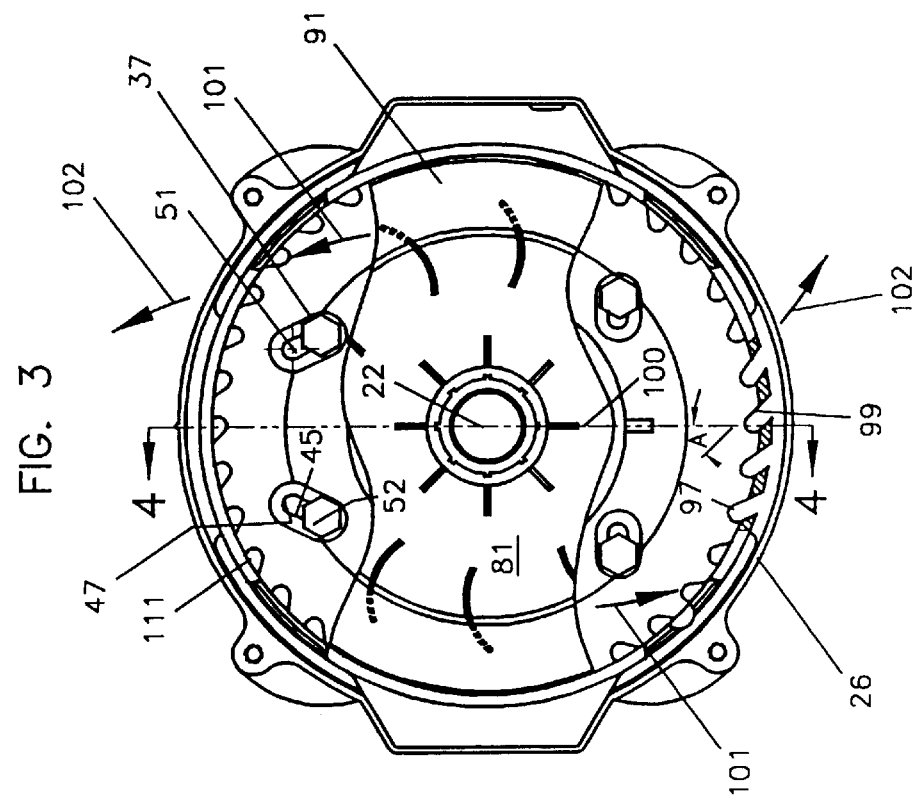
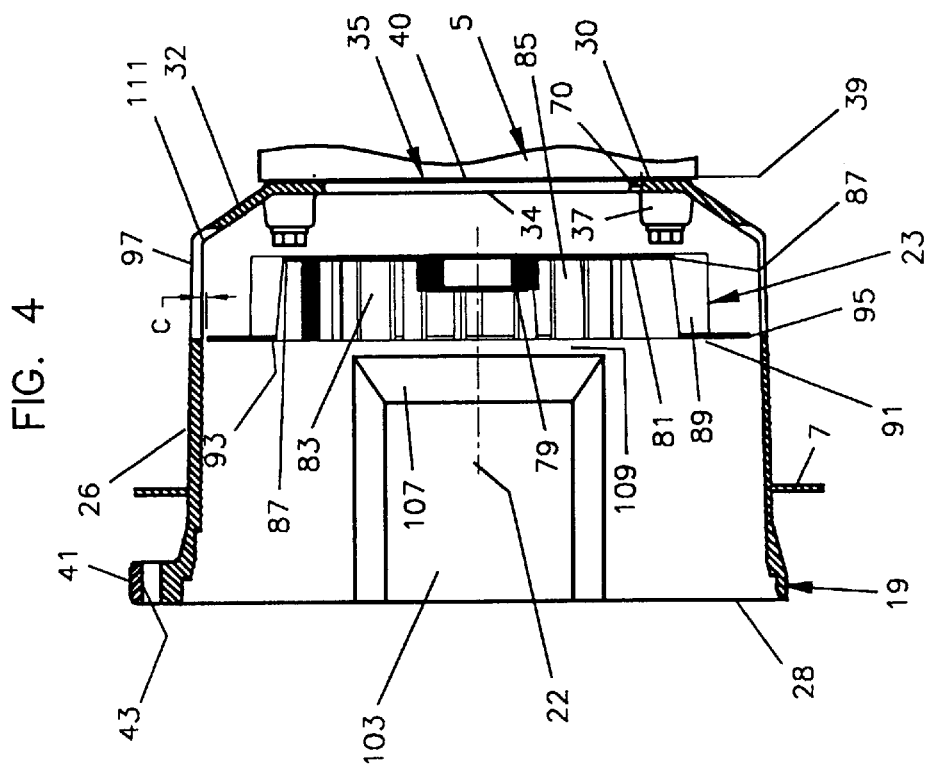

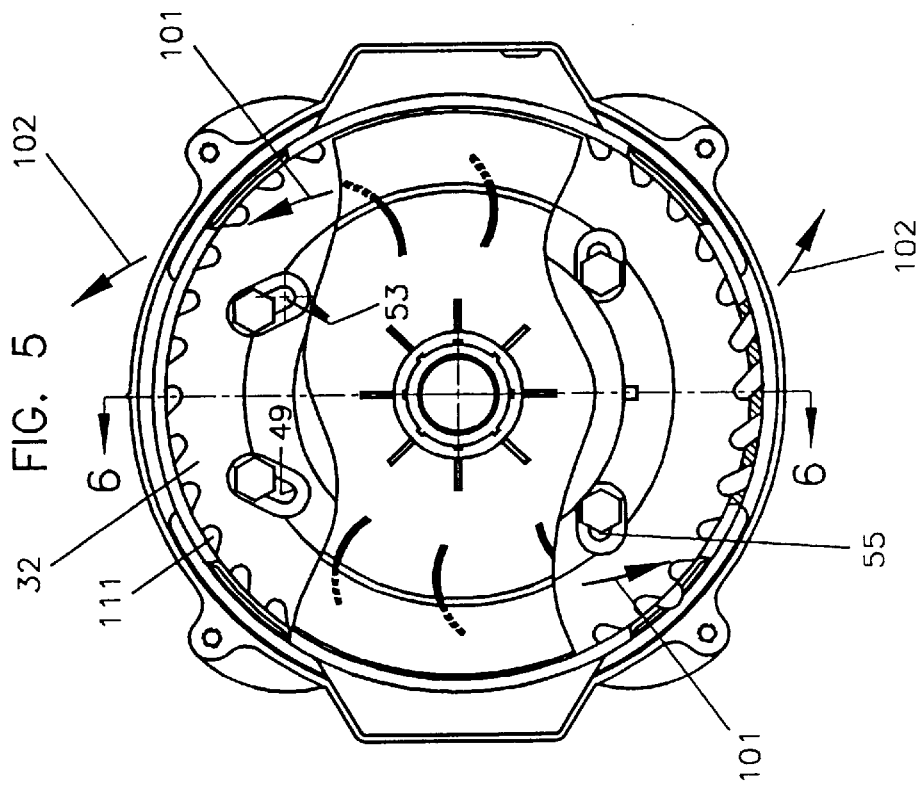
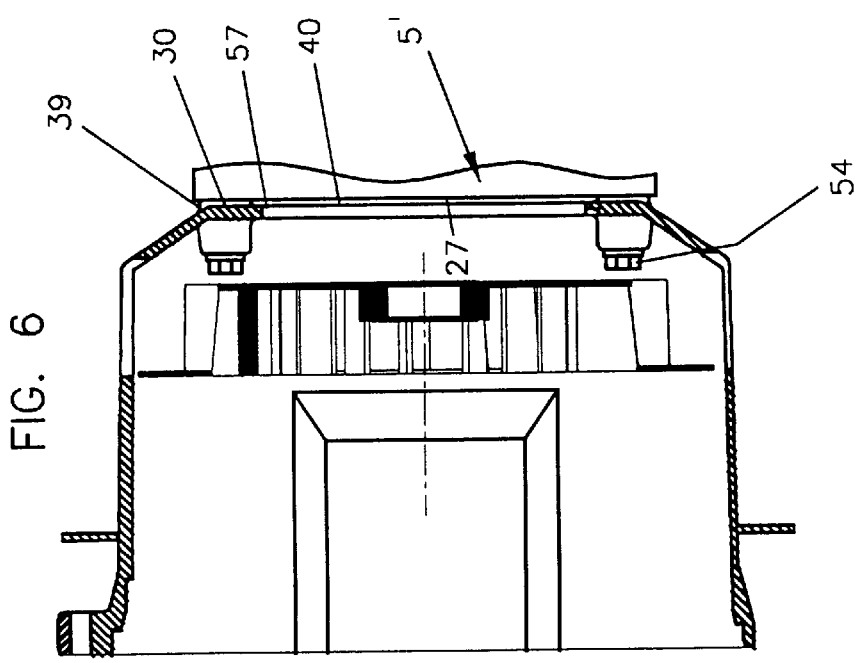

DIE CAST HOUSING FOR WELDING MACHINE GENERATOR

BACKGROUND OF THE INVENTION

1. Field of the Invention

This invention pertains to electric generators, and more particularly to the mechanical construction of generators used on engine-driven welding machines.

2. Description of the Prior Art

In portable engine-driven welding machines, an internal combustion engine provides the mechanical power to rotate a generator. In turn, the generator creates electric power for operating the numerous electrical components that enable welding to take place.

To effectively and economically serve its purpose, a welding machine generator must fulfill several requirements. It must be rigidly stationary with respect to the engine. It must be well cooled. Ideally, its cooling system should also cool the various other welding-related components inside the welding machine. For economy purposes, it is highly desirable that different engines can be used in a welding machine with minimum alterations to the generator.

Generators used in prior engine-driven welding machines were typically constructed with two end housings and a steel barrel captured between them. The generator stator was secured to the barrel. In some prior generators, the barrel was designed to produce parallel cooling air flow paths inside the welding machine. One path was through the stator of the generator to cool it. Another path was mostly outside the generator to cool the welding-related electrical components inside the welding machine but outside the generator.

Factors that detrimentally affected prior generator performance, even during normal operation, included unequal thermal expansion of the generator components. For example, to minimize generator weight, the end housings were frequently made of aluminum. Since the aluminum end housings and the steel stator and barrel expanded at different rates with temperature, there was a tendency to develop excessive thermal stresses. In addition, prior generators suffered from the disadvantage of being limited to mounting to only a single internal combustion engine. The three-piece construction of two end housings plus a barrel was also undesirably expensive and difficult to assemble.

Thus, further development of welding machine generators is desirable.

SUMMARY OF THE INVENTION

In accordance with the present invention, a die cast housing for engine-driven welding machine generators is provided that is more reliable and versatile than prior generator housings. This is accomplished by apparatus that eliminates the need for a barrel between two end housings.

The generator housing of the invention comprises a rear generator housing with an end wall that mounts to a mounting face of an internal combustion engine. An annular wall extends longitudinally from the end wall to an open end. At the open end of the annular wall are several lugs. A front generator housing attaches directly to the open end of the rear generator housing by means of the lugs.

It is a feature of the invention that the rear generator housing is interchangeable with at least two different internal combustion engines. For that purpose, the end wall of the rear generator housing is constructed with teardrop shaped mounting holes. First ends of the mounting holes are sized and located to suit the mounting hole pattern of a first engine. The other ends of the mounting holes are sized and shaped to suit the mounting pattern of a second engine. The teardrop shaped mounting holes are surrounded by elongated bosses on the exterior of the end wall. When the rear generator housing is used with the first engine, the bosses contact the mounting face of the engine. The bosses are machined off the end wall when the rear generator housing is mounted to the second engine. The rear generator housing end wall is also machineable to suit the pilots of at least two different engines. In that manner, a single casting for the rear generator housing is adaptable to different engines.

The front generator housing has an annular wall with lugs at an open end thereof. The other end of the annular wall blends into strips that support a bearing for the generator rotor. The front generator housing lugs attach to corresponding lugs on the rear generator housing. Both the front and rear generator housings are made from an aluminum alloy. The same front generator housing is used with all rear generator housings and internal combustion engines.

According to one aspect of the invention, the generator stator is secured entirely to one or the other of the generator housings. The stator is thus not a factor in the mounting of the generator to the internal combustion engine. In one embodiment, long screws are used to secure the stator to small radial pads on the selected housing. The screws are threaded into the same pads. The screws are adequately preloaded at installation such that no loosening tendencies occur during welding machine operation. In other embodiments, other types of fasteners are used, and the stator is sandwiched between the halves of the generator. The entire stator securement design is such that uneven thermal expansion of the housings and the stator have no detrimental effect on the generator.

The generator housing of the invention provides improved cooling, both to the generator itself and to the other electrical components inside the welding machine. That is achieved by a combined fan and baffle that rotates with the generator rotor. The baffle is an annular plate with a periphery that is very close to the inner diameter of the rear generator housing annular wall. The fan blades are between the baffle and the rear generator housing end wall. The blades extend radially inwardly of a baffle inner diameter.

Radially aligned with the fan blades are a number of slots through the annular wall of the rear generator housing. The slots do not pass radially through the rear generator housing annular wall. Rather, the slots have tangential components that are designed to maximize air movement through them as the air is accelerated from the fan blades.

To further increase generator cooling efficiency, the rear generator housing has one or more side ducts between its open end and the radial slots. Each side duct has a large area through which air bypasses the stator and is drawn into the interior of the rear generator housing by the fan. The side ducts enable large amounts of cooling air to flow past the various electrical components inside the welding machine but outside the generator.

The method and apparatus of the invention, using a front generator housing that attaches directly to a rear generator housing having side ducts and tangentially oriented slots, thus provides improved welding machine cooling. Because the stator is secured to only one of the housings, thermal expansion of the stator and housings has no effect on welding machine operation, even though the housings and stator are made of different materials.

Other advantages, benefits, and features of the present invention will become apparent to those skilled in the art upon reading the detailed description of the invention.

BRIEF DESCRIPTION OF THE DRAWINGS

FIG. 2 is an exploded view of the generator of the present invention.

FIG. 3 is a broken longitudinal view of the fan and rear generator housing mounted to a first internal combustion engine.

FIG. 4 is a cross sectional view taken along line 4—4 of FIG. 3.

FIG. 5 is a view similar to FIG. 3, but showing the rear generator housing mounted to a different engine.

FIG. 6 is a view similar to FIG. 4, but showing the rear generator housing mounted to the engine of FIG. 5.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
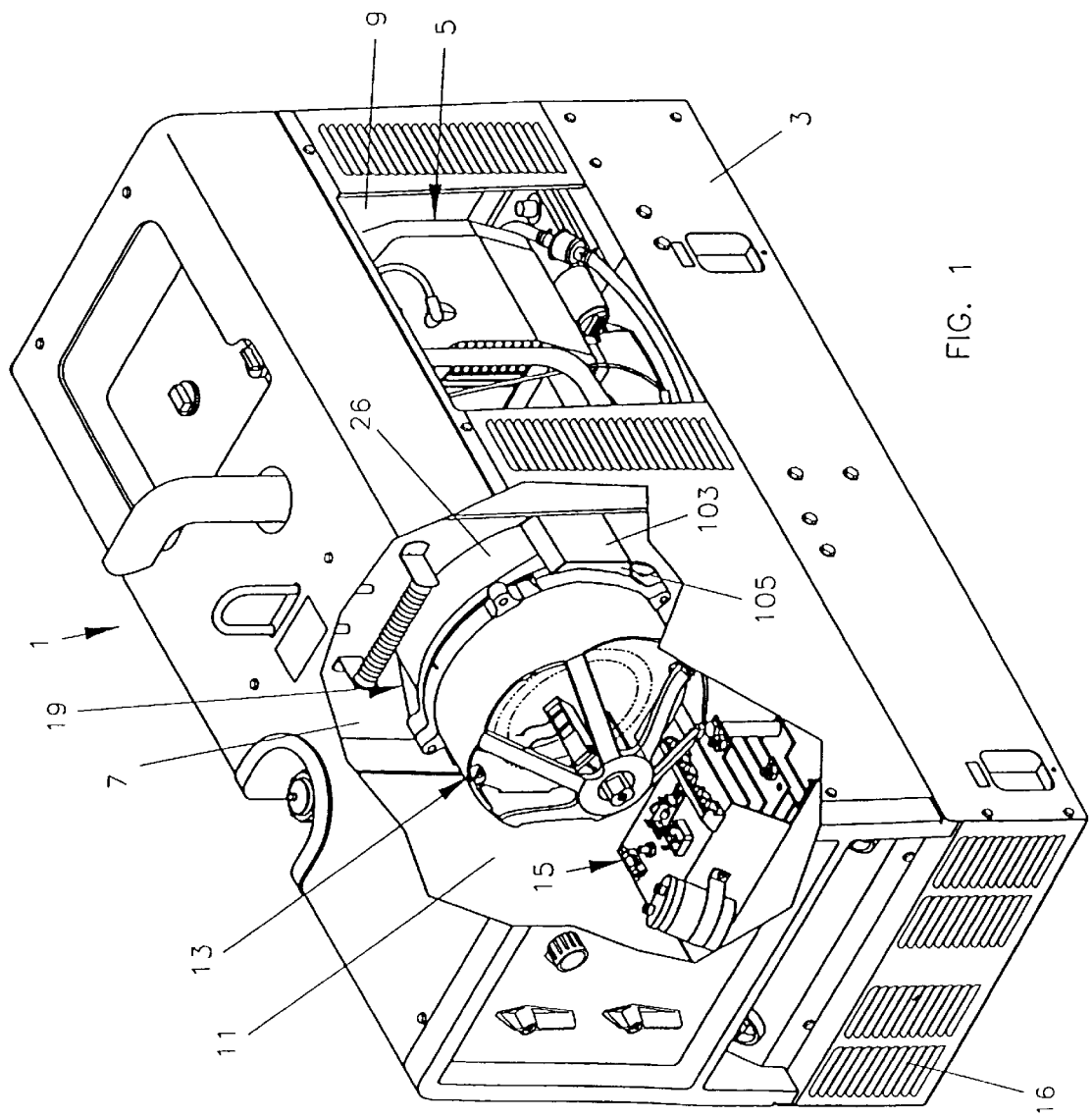
FIG. 1 is a partially broken prospective view of a typical engine-driven welding machine that advantageously includes the generator according to the present invention.

Referring to FIG. 1, a typical engine-driven welding machine 1 is illustrated that includes the present invention. The welding machine 1 is comprised of a base 3 that supports an internal combustion engine 5. A cross panel 7 divides the welding machine into an engine compartment 9 and an electrical compartment 11. An electric generator 13 is mounted to the internal combustion engine 5, as will be explained in detail shortly. One portion of the generator 13 is in the electrical compartment 11, and another portion of the generator is in the engine compartment 9. Various electrical components collectively represented at reference 15 convert electric power produced by the generator into power suitable for welding. Air can enter the machine electrical compartment through louvers 16 in the base 3.

In accordance with the present invention, the generator 13 is constructed to give high reliability and versatility to the welding machine 1. Also looking at FIG. 2, the generator is comprised of a front generator housing 17 and a rear generator housing 19. Both the front generator housing 17 and the rear generator housing 19 are made as die castings, and both are preferably made from an aluminum alloy material. The generator further comprises a rotor 21 that rotates about a longitudinal axis 22 and a stator 25. There is a fan 23 on the rotor 21.

The rear generator housing 19 is constructed with an annular wall 26 that has an open end 28 and a mounting end 35. Also see FIGS. 3 and 4. The rear generator housing mounting end 35 includes an end wall 30 and an angled wall 32 between the end wall 30 and the annular wall 26. On the interior surface 34 of the end wall are a series of elongated bosses 37. There are similar bosses 39 on the exterior surface 40 of the end wall, FIG. 6. There are several lugs 41 spaced around the annular wall at the open end 28. Each lug 41 has a tapped hole 43.

It is an important feature of the generator 13 of the invention that it is mountable to different internal combustion engines with a minimum of alteration. Every engine has a mounting face, such as face 27 on the engine 5, and a pilot 24. Every engine also has a crankshaft 29. The rotor 21 is connected by known means to the engine crankshaft 29. In the engine mounting face 27 are a number of tapped mounting holes 31. The pattern of the mounting holes 31, as well as their size, varies between different engines. For example, in one commercial engine the tapped mounting holes have a ⅜ inch diameter. In another engine, the tapped mounting holes have a 7/16 inch diameter. In addition, the distance from the engine mounting face to the end 33 of the crankshaft 29 varies between engines. The diameter of the pilot 24 of one typical engine is 5.75 inches. In another engine, the pilot diameter is 6.38 inches.

To enable the generator 13 to be easily interchangeable for mounting to different internal combustion engines, teardrop shaped clearance holes 45 are formed through the bosses 37 and 39. Each clearance hole 45 has a first end 47 and a second end 49. Also see FIG. 5. Each first end 47 has a radius concentric with a first centerline 51. The centerlines 51 of all the clearance holes have the same pattern as the capped holes 31 on the mounting face 27 of a first internal combustion engine 5. The nominal radius of the first end of each clearance hole is the same as the radius of the mounting screw 52 for the engine 5. The second end 49 of each clearance hole has a radius concentric with a second centerline 53. The centerlines 53 have the same pattern as the tapped mounting holes of a second engine 5', FIG. 6. The nominal radius of the second end of each clearance hole is the same as the radius of the mounting screw 54 for the second engine 5'. Because the radii at the ends of the clearance holes are unequal, the side surfaces 55 of the clearance holes are not parallel. Rather, they taper to give the clearance holes a generally teardrop shape.

The front generator housing 17 has an annular wall 59 with an open end 61. Lugs 63 on the front generator housing open end 61 align with the lugs 41 on the rear generator housing 19. Screws 65 through the front generator housing lugs 63 engage the tapped holes 43 in the rear generator housing lugs to attach the two housings to each other. The front generator housing has several angled strips 67 between the annular wall 59 and a support ring 68. The support ring 68 supports a bearing 69 on one end of the rotor 21. The same front generator housing and rotor are used on all generators 13, regardless of the internal combustion engine 5 or 5' that is used.

As mentioned, the distance from the engine mounting face 27 to the end 33 of the crankshaft 29 varies among different internal combustion engines. To enable the same generator rotor 21 and front generator housing 17 to be used in all welding machines 1 regardless of the engine, the rear generator housing 19 is designed to accommodate the different distances between the engine mounting face and the crankshaft end. Specifically, the rear generator housing bosses 39 are so dimensioned that when the second engine 5' is used, only a very light machining operation is made on the boss surface 57 that abuts the engine mounting face 27, FIG. 6. On the other hand, when the first engine 5 is used, the bosses are machined off entirely, FIG. 4. In that case, the surface 40 of the end wall 30 mounts directly to the engine mounting face.

The casting for the rear generator housing 19 is further designed to accommodate the different diameters of the pilots 24 of the internal combustion engines 5 and 5'. There is sufficient metal in the casting back wall 30 to machine a circumferential locating surface 70 with a diameter that suits the pilots 24 of both engines.

It is an important feature of the invention that the generator stator 25, which is composed of steel components, is secured to only one of the front generator housing 17 or the rear generator housing 19. In the particular construction illustrated, the stator is secured to the front generator housing. For that purpose, the front generator housing has several angularly spaced pads 71, each with a flat radial surface, projecting inwardly from the annular wall 59. There is a tapped hole in each pad 71. The stator end surface 73 abuts the radial surfaces of the pads. Long steel screws 77 pass through clearance holes 75 in the stator and thread into the pad tapped holes, thereby securing the stator to the pad radial surfaces.

During operation of the welding machine 1, it is inevitable that the generator 13 and other machine components heat up. Further, the generator is subject to vibrations from the internal combustion engine 5 as well as any minor imbalance of the rotor 21. It is imperative that the mechanical components of the generator do not loosen during operation. Consequently, the screws 52, 54, and 65 are adequately preloaded. The screws 77 are also preloaded. The long lengths of the screws 77 plus the preload on them assure that they do not loosen during welding machine operation. That is true even though the steel stator is secured to the aluminum front generator housing, and even though the stator and housing thermally expand at different rates. In addition, because the stator is secured to only one housing, the front generator housing 17 in the illustrated case, that housing can expand freely without any effect on the expansion of the stator or on the rear generator housing 19. The fact that the stator securement pads 71 and the respective stator screws 77 are axially aligned with each other also contribute to the joint between the stator and the front generator housing being unaffected by thermal expansion. In that manner, thermal stresses in the housing and stator are practically non-existent.

Figure 7:
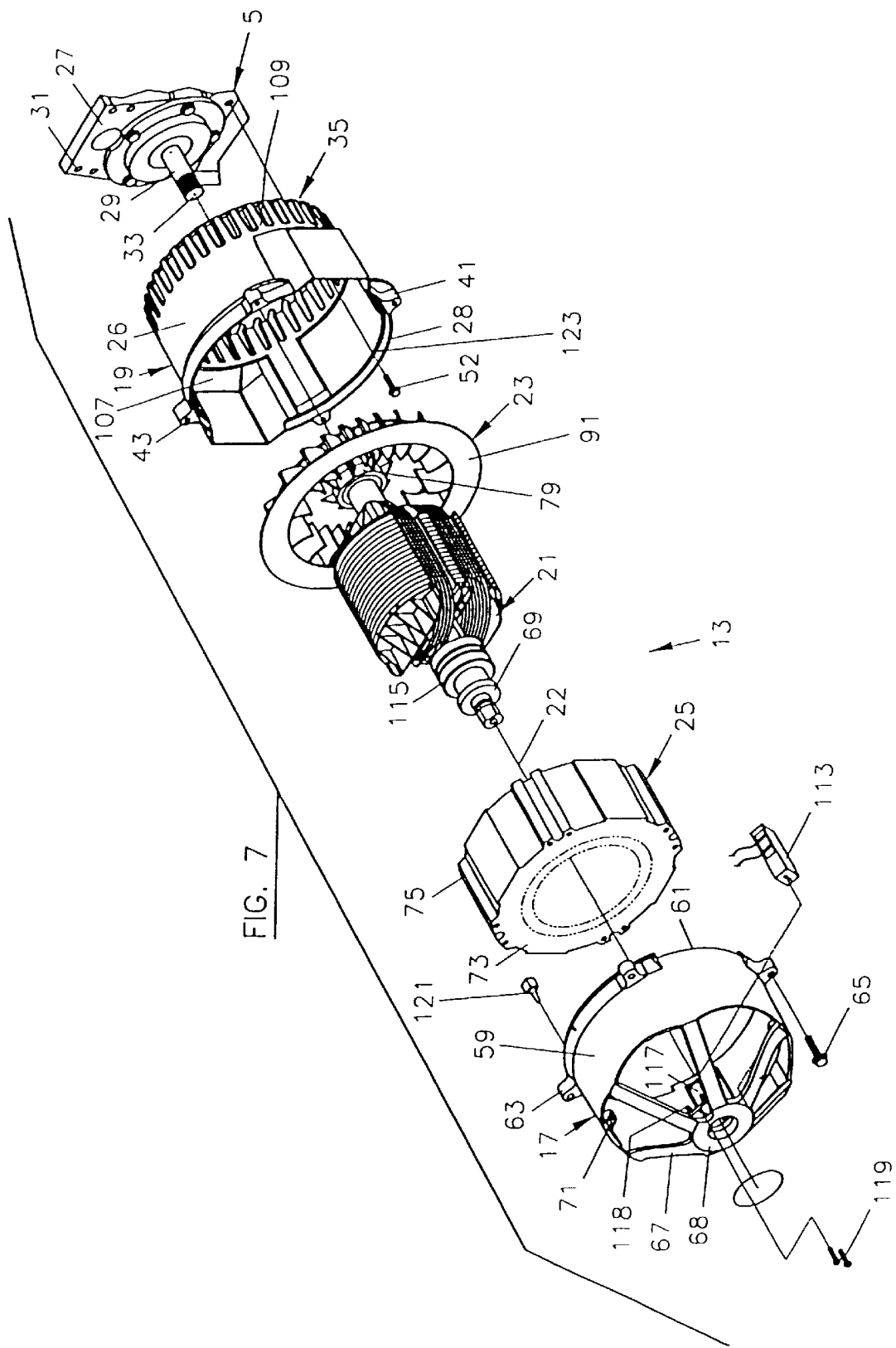
FIG. 7 is a view generally similar to FIG. 2, but showing an alternate embodiment of securing the stator to the generator housings.

In FIG. 7, an alternate embodiment for securing the stator 25 to the generator housings 17 and 19 is shown. Interposed between the stator end surface 73 and each pad 71 is a compressible preload element 121. As illustrated, the preload element is a rubber block. However, other compressible elements, such as steel Belleville springs can also be used. The stator end surface opposite the surface 73 abuts a radial surface 123 in the rear generator housing. When the screws 65 are installed and tightened, the rubber blocks or other elements compress to preload the stator between the generator housing. The compression in the preload elements varies with operation of the generator, but the stator is nevertheless constantly in stable securement between the housing. It will be appreciated, of course, that the preload elements can be located between the stator and the rear generator housing, if desired, rather than between the stator and the front generator housing.

Further in accordance with the present invention, the generator 13 provides improved cooling to the welding machine 1. Cooling is provided by the circulation of air both around the electrical components 15 and through and around the generator. Air movement is created by the fan 23. The fan has a hub 79 that rotates with the rotor 21. A thin disk 81 surrounds the hub 79. Several blades 83 have respective first edges 85 joined to the disk 81. The blades 83 extend radially outwardly from the outer periphery 87 of the disk.

Integral with second edges 89 of the fan blade 83 is a thin baffle 91. The inner diameter 93 of the baffle 91 is slightly greater than the diameter of the outer periphery 87 of the disk 81, which allows the fan to be made with a single two-piece mold with no core pulls. There is minimum clearance C between the outer diameter 95 of the baffle and the annular wall 26 of the rear generator housing 19. It is thus seen that the fan incorporates both the cooling fan and the baffle in a one-piece design. The cross panel 7 of the welding machine 1 is between the fan baffle and the rear generator housing open end 28.

During operation of the welding machine 1, the fan blade 83 accelerates the air particles in generally tangential directions with streams that encircle the fan. The streams are directed in the same angular direction as the direction of fan rotation. For example, for a counterclockwise rotation with respect to FIG. 3, air comes off the fan blades in tangential streams represented by arrows 101.

The welding machine cooling system further includes a series of slots 97 through and arranged circumferentially around the rear generator housing annular wall 26. The slots 97 are radially aligned with the fan blades 83. As best shown in FIGS. 3 and 5, the sides 99 of the slots are not directed radially toward the generator axis 22. Rather, the slot sides 99 have tangential components such that the sides of each slot make an angle A with a plane, such as plane 100, passing longitudinally through the axis 22 and the slot. The sides 99 of all the slots make the same angle A with the radial planes through the respective slots. An angle A of approximately 45 degrees works very well. All the slots are oriented in a direction generally parallel to the streams 101 of air coming off the fan blades. Consequently, the fan expels all the air from the rear generator housing in streams 102 having the same general tangential directions and encircling the rear generator housing in the same radial direction as the streams 101. The minimum clearance C between the baffle 91 and the rear generator housing annular wall 26 assures that the fan 23 properly moves air through the generator 13.

To enable the rear generator housing 19 to be easily die cast despite the presence of the slots 97 in the annular wall 26, the slots are not located just in the annular wall. Rather, they have respective extensions ill in the angled wall 32. The extensions 111 have respective sides that are continuations of the sides 99 of the respective slots. Accordingly, the extension sides make the angle A with the various radial planes passing through the slots. The slot extensions enable the rear generator housing casting to be pulled from the mold during the casting process. In addition, the extensions provide increased areas for the passage of the cooling air streams 101. On the other hand, both the slots and the extensions are small enough to prevent a person's fingers from entering them.

To assure adequate cooling of the electrical components 15 in the welding machine electrical compartment 11, the rear generator housing 19 includes a pair of side ducts 103. The side ducts 103 protrude from the rear generator housing annular wall 26 and have respective openings 105 that are generally in line with the open end 28 of the rear generator housing. The ducts have tapered back walls 107 that end in the region 109 between the fan baffle 91 and the slots 97.

During operation of the welding machine 1, the fan 23 draws air through the louvers 17 of the base 3 and into the electrical compartment 11. All the air flows past the electrical components 15 to cool them. Some of the air then flows into the front generator housing 17 and past the rotor 21 and stator 25 to the fan. A parallel path of air flows outside the front generator housing and into the rear generator housing side ducts 103. All the air rejoins at the fan to be expelled out the slots 97 into the welding machine engine compartment 9.

According to another aspect of the invention, the generator 13 has brushes for the rotor slip rings 115 that are exceptionally easy to install and remove. For that purpose, the front generator housing 17 is fabricated with an open pocket 117 near the support ring 68. A pair of guides 118 project from one side of the pocket so as to form a channel. The brushes are part of a block assembly 113 that is retained in the pocket 117 and guided in the channel by the guides 118. Screws 119 removabley retain the block assembly 113 in place in the pocket. In that manner, the brushes are very easily installed into and removed from the generator.

Thus, it is apparent that there has been provided, in accordance with the invention, a die cast housing for an engine-driven welding machine that fully satisfies the aims and advantages set forth above. While the invention has been described in conjunction with specific embodiments thereof, it is evident that many alternatives, modifications, and variations as to sizes and shapes will be apparent to those skilled in the art in light of the foregoing description. Accordingly, it is intended to embrace all such alternatives, modifications, and variations as fall within the spirit and broad scope of the appended claims.

What is claimed is:

1. A die cast housing for an engine-driven welding machine generator having a longitudinal axis comprising:
    a. a rear generator housing having an annular wall with an open end and an end wall having an exterior surface with a plurality of bosses thereon, the rear generator housing defining a clearance hole through each of the bosses, each clearance hole having a size and shape to receive screws for mounting the rear generator housing to at least two different selected internal combustion engines having respective different mounting hole patterns; and
    b. a front generator housing attached to the rear generator housing.

2. The die cast housing of claim 1 wherein the end wall of the rear generator housing is machinable to define a selected one of at least two pilot locating surfaces for mounting the rear generator housing to at least two different selected internal combustion engines having respective different pilot diameters.

3. The die cast housing of claim 1 wherein:
    a. the bosses on the rear generator housing are in facing contact with a mounting face of a first selected internal combustion engine when the rear generator housing is mounted to the first engine; and
    b. the rear generator housing bosses are machined off the rear generator housing end wall exterior surface and so that the rear generator housing end wall is in facing contact with the mounting face of the second internal combustion engine when the rear generator housing is mounted to the second engine.

4. The die cast housing of claim 1 wherein:
    a. each of the rear generator housing clearance holes has two ends that define respective unequal radii; and
    b. the clearance holes define respective opposed side surfaces that connect the clearance hole end radii,
    so that the clearance holes have a generally teardrop shape.

5. The die cast housing of claim 1 wherein:
    a. the rear generator housing comprises an angled wall between the annular wall and the end wall; and
    b. the rear generator housing defines a plurality of slots through and arranged circumferentially around the annular wall and having respective extensions in the rear generator housing angled wall, each slot having opposed sides that make a predetermined angle with a longitudinal plane passing through the generator longitudinal axis and through the slot.

6. The die cast housing of claim 5 wherein the predetermined angle of the sides of each slot with the respective longitudinal plane through the slot is approximately 45 degrees.

7. The die cast housing of claim 5 wherein:
    a. the front generator housing is fabricated with an open pocket including guides that define a channel, the pockets holding and guiding a brush block assembly; and
    b. the die cast housing further comprises fastener means for removabley retaining the brush block assembly in the front generator housing pocket.

8. The die cast housing of claim 1 wherein the rear generator housing is formed with at least one side duct that protrudes from the annular wall and has an opening that is generally in line with the rear generator housing open end.

9. In an engine-driven welding machine having a base with louvers therein:
    a. a first selected internal combustion engine supported on the base and having a crankshaft and a mounting face with a first pattern of mounting holes therein; and
    b. a generator mounted to the internal combustion engine comprising:
        i. a rear generator housing having an end wall mounted to the internal combustion engine mounting face and an annular wall with an open end;
        ii. a front generator housing having an annular wall with an open end that is attached to the open end of the rear generator housing annular wall;
        iii. a rotor having one end supported in the front generator housing and driven by the internal combustion engine crankshaft for rotation about a longitudinal axis;
        iv. a stator located between the rear and front generator housings and surrounding the rotor; and
        v. means for securing the stator solely to a selected one of the rear and front generator housings with a preload that prevents loosening of the stator therefrom during welding machine operations.

10. The engine-driven welding machine of claim 9 wherein the means for securing the stator comprises a plurality of stator screws securing the stator solely to the selected one of the front generator housing or the rear generator housing, the stator screws being preloaded to a predetermined torque that prevents loosening of the stator on the selected generator housing during welding machine operation.

11. The engine-driven welding machine of claim 9 wherein the rear generator housing end wall defines a plurality of clearance holes having respective sizes and shapes that receive first fasteners for engaging the first pattern of the mounting holes in the first selected internal combustion engine, and that receive second fasteners for engaging a second pattern of mounting holes in a second selected engine.

12. The engine-driven welding machine of claim 10 wherein each clearance hole in the rear generator housing has a first end that defines a first radius that receives a first fastener, a second end that defines a second radius smaller than the first radius and that receives a second fastener, and a pair of opposed surfaces that connect the first and second radii,
    so that the first and second radii and the side surfaces cooperate to form a generally teardrop shaped clearance hole.

13. The engine-driven welding machine of claim 10 wherein the rear generator housing end wall includes a boss associated with each clearance hole, the bosses being in contact with the first selected internal combustion engine when the generator is mounted whereto, the bosses being removed from the end wall and the rear generator housing end wall being in contact with the second selected engine when the generator is mounted to the second selected engine.

14. The engine-driven welding machine of claim 10 wherein the stator is secured by the stator screws solely to the front generator housing.

15. The engine-driven welding machine of claim 10 wherein:
   a. the front generator housing and the rear generator housing are die cast from an aluminum alloy;
   b. the stator and stator screws are made from steel; and
   c. the rear generator housing and front generator housing die castings and the stator undergo unequal thermal expansion during operation of the welding machine without imposing thermal stresses on the generator housings or the stator.

16. The engine-driven welding machine of claim 14 wherein:
   a. the front generator housing is fabricated with a plurality of flat pads lying in a plane radial to the longitudinal axis; and
   b. the stator screws secure the stator to the front generator housing flat pads and the stator screws are threaded into the flat pads,
   so that the stator securement pads and the respective stator screws are axially aligned with each other to minimize thermal stresses on the stator and front generator housing.

17. The engine-driven welding machine of claim 9 wherein the rear generator housing annular wall defines a plurality of circumferentially spaced slots each having opposed sides, the sides of the slots making a same predetermined acute angle with respective longitudinal planes passing through the slots and through the longitudinal axis.

18. The engine-driven welding machine of claim 17 wherein:
   a. the rear generator housing comprises an angled wall between the end wall and the annular wall; and
   b. the rear generator housing slots extend into the rear generator housing angled wall, each slot in the angled wall having opposed sides that make the same predetermined angle with a respective longitudinal plane passing through the slot in the angled wall and the longitudinal axis as the sides of the associated slot in the annular wall.

19. The engine-driven welding machine of claim 17 further comprising a fan that rotates with the generator rotor and comprising:
   a. a hub that rotates with the rotor;
   b. a disk surrounding the hub;
   c. a plurality of blades having respective first edges joined to the disk; and
   d. a baffle integral with second edges of the blades, the baffle having an outer periphery that is at a close clearance to the rear generator housing annular wall and located between the slots therein and the rear generator housing open end, the fan drawing air through the louvers in the welding machine base and along a first path through the front and rear generator housings and expelling the air out the rear generator housing slots during operation of the welding machine.

20. The engine-driven welding machine of claim 19 wherein the rear generator housing includes at least one side duct that enables flow of air along a second path outside the front generator housing and into the rear generator housing at a location between the fan and the rear generator housing slots,
   so that the fan expels air from the first and second paths simultaneously out the slots in the rear generator housing.

21. The engine-driven welding machine of claim 9 wherein:
   a. the front generator housing is fabricated with an open pocket having sides and a pair of guides projecting from one of the sides; and
   b. the generator further comprises a brush block assembly guided in the front generator housing pocket, and fastening means for removabley retaining the brush block assembly in the front generator housing pocket.

22. The engine-driven welding machine of claim 9 wherein the means for securing the stator comprises:
   a. at least one preload element interposed between the stator and a selected one of the rear and front generator housing; and
   b. fastener means for attaching the rear and front generator housing to each other and for simultaneously producing a predetermined preload on said at least one preload element that prevents loosening of the stator from between the rear and front generator housings during welding machine operation.

23. In a welding machine having an internal combustion engine, a generator driven by the internal combustion engine for producing electrical power comprising:
   a. a rear generator housing mounted to the internal combustion engine;
   b. a front generator housing attached to the rear generator housing;
   c. a stator between the front and rear generator housings; and
   d. means for maintaining a preload between the stator and the front and rear generator housings during operation of the welding machine.

24. The welding machine of claim 23 wherein the means for maintaining a preload comprises a preload element interposed between the stator and a selected one of the front and rear generator housings.

25. The welding machine of claim 24 wherein the preload element comprises at least one rubber block interposed between the stator and the front generator housing.

* * * * *